United States Patent
Wakuda (10) Patent No.: US 11,009,454 B2
(45) Date of Patent: May 18, 2021

(54) FOURIER TRANSFORM INFRARED SPECTROMETER

(71) Applicant: Shimadzu Corporation, Kyoto (JP)

(72) Inventor: Shinya Wakuda, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 16/693,494

(22) Filed: Nov. 25, 2019

(65) Prior Publication Data

US 2020/0217786 A1 Jul. 9, 2020

(30) Foreign Application Priority Data

Jan. 8, 2019 (JP) .............................. JP2019-001203

(51) Int. Cl.
*G01N 21/27* (2006.01)
*G01N 21/25* (2006.01)
(Continued)

(52) U.S. Cl.
CPC ......... *G01N 21/274* (2013.01); *G01N 21/255* (2013.01); *G01N 21/359* (2013.01);
(Continued)

(58) Field of Classification Search
CPC .. G01N 21/274; G01N 21/255; G01N 21/359; G01N 2201/12746;
(Continued)

(56) References Cited

U.S. PATENT DOCUMENTS

2006/0238768 A1* 10/2006 Brorson ................ G01J 3/4535
356/451
2011/0235034 A1* 9/2011 Fukuda .................... G01J 3/02
356/319

FOREIGN PATENT DOCUMENTS

JP 2016-142527 A 8/2016

OTHER PUBLICATIONS

Chaplin ("Water Absorption Spectrum", http://www.infotc.co.kr/bin/minihome/upload/7588/pds/upload/Water%20absorption%20spectrum.pdf; published Jul. 1, 2017). (Year: 2017).*

* cited by examiner

*Primary Examiner* — David P Porta
*Assistant Examiner* — Meenakshi S Sahu
(74) *Attorney, Agent, or Firm* — Obion, McClelland, Maier & Neustadt, L.L.P.

(57) ABSTRACT

In an FTIR 1, a beam splitter 12, fixed mirror 13 and movable mirror 14 are shared by a main interferometer 10 including a multiwavelength infrared light source 11 and a control interferometer 20 including a semiconductor laser 21. A first detector 16 detects infrared interference light generated by the main interferometer 10 and transmitted through or reflected by a sample. A second detector 26 detects monochromatic interference light generated by the control interferometer 20. A spectrum creator 32 determines an optical path difference between an optical path via the fixed mirror 13 and an optical path via the movable mirror 14, based on the intensity and uncalibrated oscillation wavelength of the monochromatic interference light detected by the second detector 26, and creates a spectrum by performing fast Fourier transform on an interferogram which shows a distribution of the intensity of the infrared interference light detected by the first detector 16 with respect to the optical path difference. An oscillation wavelength calibrator 34 locates an absorption peak of carbon dioxide from the peaks in the spectrum created by the spectrum creator 32, and compares a wavenumber or wavelength of the absorption peak with a true absorption wavenumber or wavelength of carbon dioxide to determine a calibrated oscillation wavelength of the semiconductor laser 21.

20 Claims, 3 Drawing Sheets

(51) Int. Cl.
*G01N 21/359* (2014.01)
*G01N 21/35* (2014.01)
(52) U.S. Cl.
CPC ............... *G01N 2021/3595* (2013.01); *G01N 2201/0612* (2013.01); *G01N 2201/06106* (2013.01); *G01N 2201/12746* (2013.01)
(58) Field of Classification Search
CPC . G01N 2201/06106; G01N 2201/0612; G01N 2021/3595; G01J 2003/102; G01J 3/108; G01J 3/28; G01J 3/4535; G01J 3/08
See application file for complete search history.

FOURIER TRANSFORM INFRARED SPECTROMETER

TECHNICAL FIELD

The present invention relates to a Fourier transform spectrometer (FTIR).

BACKGROUND ART

An FTIR normally includes a multiwavelength infrared light source which generates infrared light having many wavelengths superposed on each other, a beam splitter, and an interferometer which includes a fixed mirror and a movable mirror (for example, see Patent Literature 1). The infrared light generated by the light source is split into two beams by the beam splitter. One beam is reflected by the fixed mirror, while the other beam is reflected by the movable mirror. The reflected beams return to the beam splitter and are merged into one beam, which is cast onto a sample. The relationship between the intensity of the infrared light cast onto the sample and the position of the movable mirror can be represented by sinusoidal waves of different wavelengths superposed on each other so that the intensity has the highest value at any wavelength when the infrared beam reflected by the fixed mirror and the infrared beam reflected by the movable mirror has an optical path difference of zero (center burst). As the movable mirror moves from this position and changes the optical path difference, the peaks appear at different positions (intervals) depending on the wavelength. The infrared light cast onto the sample passes through the sample as transmitted light, or is reflected by the sample as reflected light. The transmitted or reflected light is detected with a detector to acquire an interferogram showing the relationship between the intensity of the transmitted or reflected light and the optical path difference. By performing fast Fourier transform (FFT) on this interferogram, a spectrum with the wavenumber (or wavelength) on the horizontal axis and the intensity (e.g. absorbance or transmittance) on the vertical axis is obtained. Based on the peak wavenumber (wavelength), peak intensity and other kinds of information concerning this spectrum, a qualitative and/or quantitative analysis of the sample is performed.

An accurate measurement by an FTIR requires accurate determination of the position of the movable mirror. To this end, FTIRs are normally equipped with a control interferometer using laser light (monochromatic light), in addition to the (main) interferometer for the infrared light used for the measurement. The control interferometer includes a laser light source, a beam splitter for the laser light, a fixed mirror, a movable mirror and other elements. The laser light is introduced into the beam splitter, which splits the light into two beams. One beam is reflected by the fixed mirror, while the other beam is reflected by the movable mirror. The reflected beams return to the beam splitter and are merged together. The merged laser light is detected with a detector which is separately provided from the detector for the main interferometer. The detected laser light becomes interference light whose intensity is maximized when the optical path difference equals an integer multiple of the wavelength of the laser light. Therefore, it is possible to determine that the optical path difference in the control interferometer has increased or decreased by one wavelength of the laser light every time the intensity of the interference light of the laser light is maximized. Since the beam splitter, fixed mirror and movable mirror are shared by the main interferometer and the control interferometer, the optical path difference determined in the control interferometer can be directly considered as the optical path difference in the main interferometer.

He—Ne (helium-neon) lasers, which are a type of gas laser, have conventionally been used as the laser light source for the control interferometer. In recent years, semiconductor lasers have also been used in order to reduce the size of the device. Semiconductor lasers have standard values of oscillation wavelength. The oscillation wavelength varies within a certain range around the standard value due to the individual differences of the semiconductor lasers as well as the aging. As described earlier, the optical path difference in the main interferometer (and control interferometer) is determined based on the wavelength of the laser light. Therefore, it is necessary to accurately determine this optical path difference in order to accurately determine the interferogram measured with the main interferometer as well as the spectrum obtained by performing FFT on the interferogram. Therefore, for a semiconductor laser to be used as the light source for the control interferometer, it is necessary to calibrate the oscillation wavelength considering the individual differences when the device is introduced, as well as regularly calibrate the oscillation wavelength considering the aging. Such a calibration has conventionally been performed by passing infrared light through air and measuring the transmitted beam using the FTIR. Due to the presence of a trace amount of water vapor in the air, absorption peaks originating from the water vapor appear. The calibration of the oscillation wavelength of the semiconductor laser is performed by comparing a measured value of a peak wavenumber of the water vapor with its true value (standard value).

CITATION LIST

Patent Literature

Patent Literature 1: JP 2016-142527 A

SUMMARY OF INVENTION

Technical Problem

The problem to be solved by the present invention is to provide a Fourier transform infrared spectrometer which can easily calibrate the oscillation wavelength.

Solution to Problem

The Fourier transform infrared spectrometer according to the present invention developed for solving the previously described problem includes:

a main interferometer including a multiwavelength infrared light source, a beam splitter, a fixed mirror and a movable mirror;

a control interferometer including a semiconductor laser, the beam splitter, the fixed mirror and the movable mirror;

a first detector configured to detect infrared interference light generated by the main interferometer and transmitted through or reflected by a sample;

a second detector configured to detect monochromatic interference light generated by the control interferometer;

a spectrum creator configured to determine an optical path difference between an optical path via the fixed mirror and an optical path via the movable mirror, based on the intensity and uncalibrated oscillation wavelength of the monochromatic interference light detected by the second detector, and to create a spectrum by performing fast Fourier transform on an interferogram which shows a distribution of the intensity of the infrared interference light detected by the first detector with respect to the optical path difference; and an oscillation wavelength calibrator configured to locate an absorption peak of carbon dioxide from peaks in the spectrum created by the spectrum creator, and to compare the wavenumber or wavelength of the absorption peak with the true absorption wavenumber or wavelength of carbon dioxide to determine a calibrated oscillation wavelength of the semiconductor laser.

In the Fourier transform infrared spectrometer according to the present invention, air is used as the sample for the calibration of the oscillation wavelength of the semiconductor laser in the control interferometer. The infrared interference light generated by the main interferometer is cast into the air, and the spectrum creator creates a spectrum. In the spectrum of the air, an absorption peak due to carbon dioxide appears other than the peaks of water vapor. Water vapor has many absorption peaks observed at wavenumber intervals of a few $cm^{-1}$ to tens of $cm^{-1}$. By comparison, carbon dioxide has a single absorption peak observed at or near a wavenumber of 667 $cm^{-1}$. No absorption peak due to the other components (carbon dioxide, water vapor, etc.) of the air is observed within a range of ±50 $cm^{-1}$ before and after that. Therefore, the absorption peak of carbon dioxide near the wavenumber of 667 $cm^{-1}$ can be easily distinguished from the other absorption peaks. Thus, the oscillation wavelength can be easily calibrated according to the present invention.

The accuracy of the oscillation wavelength of a semiconductor laser can be as low as approximately ±20 nm if the semiconductor laser is an inexpensive one. For example, consider an inexpensive semiconductor whose standard oscillation-wavelength value is 850 nm. If the actual oscillation wavelength is 870 nm, which is 20 nm longer than the standard value, the absorption peak of water vapor whose true wavenumber is 1616.7 $cm^{-1}$ will have a measured value of 1616.7×(850/870)=1579.5 $cm^{-1}$. The difference between the true value and the measured value is 37.2 $cm^{-1}$. The number of absorption peaks of water vapor is not one; a considerable number of peaks are observed at wavenumber intervals of a few $cm^{-1}$ to tens of $cm^{-1}$. If the difference between the true value and the measured value of the peak wavenumber is as large as tens of $cm^{-1}$ (in the previous example, 37.2 $cm^{-1}$), it is impossible to determine which of those peaks has been measured. Therefore, in the case of using an inexpensive semiconductor laser, it is impossible to calibrate its oscillation wavelength if an absorption peak of water vapor is used as the reference as in a conventional device. By comparison, in the present invention, since the absorption peak of carbon dioxide which can be easily distinguished from the other absorption peaks is used for the calibration in the previously described manner, the calibration can be easily performed even if the accuracy of the oscillation wavelength of the semiconductor laser is low.

The Fourier transform infrared spectrometer according to the present invention may further include a oscillation wavelength precise calibrator configured to perform precise calibration of the oscillation wavelength by: creating a spectrum based on the calibrated oscillation wavelength obtained by the oscillation wavelength calibrator, the intensity of the monochromatic interference light detected by the second detector and the intensity of the infrared interference light detected by the first detector; locating one or more absorption peaks of water vapor from the peaks in the spectrum; and comparing the wavenumber or wavelength at each of the one or more absorption peaks with a true absorption wavenumber or wavelength of water vapor.

A spectrum created by using the oscillation wavelength calibrated by the oscillation wavelength calibrator has a high level of accuracy of the oscillation wavelength than before the calibration. This makes it easier to distinguish each absorption peak from the other absorption peaks even if there are many absorption peaks of water vapor. The absorption peak of carbon dioxide obtained in the case of the measurement of air has strong absorption at around 667 $cm^{-1}$. For an FTIR capable of performing a measurement over a wide range of wavenumbers, it is preferable to perform the calibration using an absorption peak at a higher wavenumber to reduce the amount of error. Therefore, the Fourier transform infrared spectrometer having the oscillation wavelength precise calibrator can more precisely calibrate the oscillation wavelength based on an absorption peak of water vapor.

The precise calibration based on an absorption peak of water vapor may be performed using only one of the absorption peaks of the water vapor. However, using two or more peaks enables a more precise calibration. In that case, the oscillation wavelength precise calibrator may be configured to perform the precise calibration so as to minimize the difference between the obtained wavenumber or wavelength and the true absorption wavenumber or wavelength for each of the absorption peaks of water vapor.

It is preferable for the Fourier transform infrared spectrometer according to the preset invention to further include a spectrum appropriateness determiner configured to determine, based on a predetermined criterion, whether or not the spectrum created by the spectrum creator is an appropriately measured spectrum of air. If the spectrum appropriateness determiner has determined that the spectrum is not an appropriately measured spectrum of air, the calibration result can be discarded to prevent the situation in which the correct absorption peak cannot be located due to the superposition of the absorption by another substance or other unfavorable effects. For example, for a created spectrum, the highest or lowest value of a background signal within each of the two separate wavenumber ranges can be determined, and the ratio of the two highest or lowest values can be used as the aforementioned criterion. If the value of this ratio is outside the normal range, a background signal which is different from the true background signal is possibly superposed due to some factors, such as the absorption of infrared light by a substance different from the air.

Advantageous Effects of Invention

According to the present invention, a Fourier transform infrared spectrometer which can easily calibrate the oscillation wavelength can be obtained.

DESCRIPTION OF EMBODIMENTS

One embodiment of the Fourier transform infrared spectrometer according to the present invention is hereinafter described using FIGS. 1-4.

Figure 1:
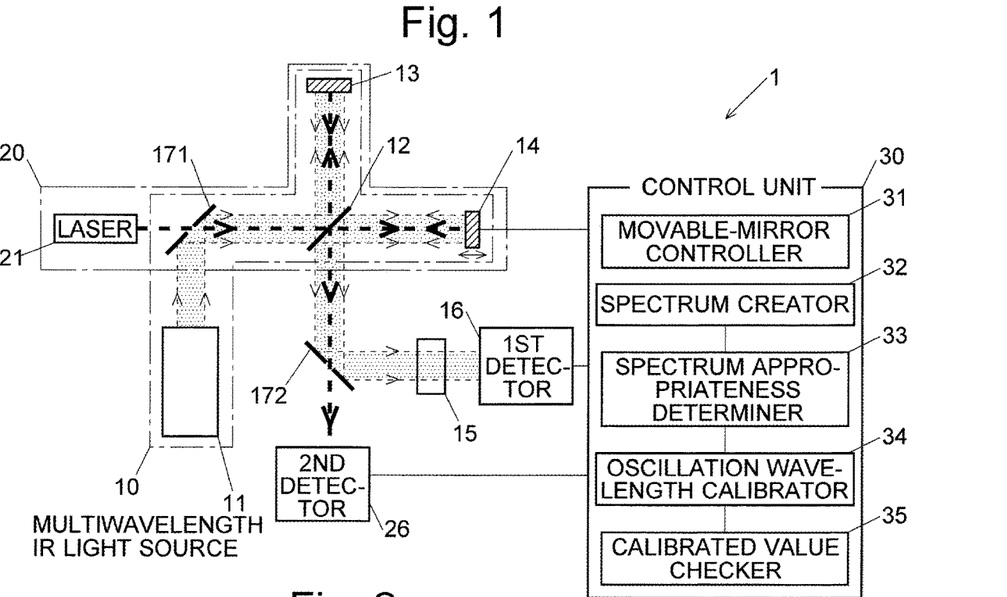
FIG. 1 is a schematic configuration diagram showing one embodiment of the Fourier transform infrared spectrometer according to the present invention.

(1) Configuration of Fourier Transform Infrared Spectrometer According to Present Embodiment FIG. 1 schematically shows the configuration of the Fourier transform infrared spectrometer (FTTR) 1 according to the present embodiment. This FTTR 1 includes a multiwavelength infrared light source 11, first converging mirror 171 for infrared optical axis, beam splitter 12, fixed mirror 13, movable mirror 14, sample chamber 15, first detector 16, second converging mirror 172 for infrared optical axis, semiconductor laser 21, second detector 26, and control unit 30. The multiwavelength infrared light source 11, first converging mirror 171 for infrared optical axis, beam splitter 12, fixed mirror 13 and movable mirror 14 constitute the main interferometer 10. The semiconductor laser 21, beam splitter 12, fixed mirror 13 and movable mirror 14 constitute the control interferometer 20. Accordingly, the beam splitter 12, fixed mirror 13 and movable mirror 14 serve as both the components of the main interferometer 10 and those of the control interferometer 20.

The multiwavelength light source 11 generates infrared light containing many wavelengths superposed on each other. The beam splitter 12 is located at an incident position of the infrared light emitted from the multiwavelength light source 11 and reflected by the first converging mirror 171 for infrared optical axis. The beam splitter 12 allows one half (in intensity) of the incident infrared light to pass through while reflecting the other half. In the present embodiment, the fixed mirror 13 is located at an incident position of the infrared light reflected by the beam splitter 12, while the movable mirror 14 is located at an incident position of the infrared light passing through the beam splitter 12. The fixed mirror 13 and the movable mirror 14 may be transposed. The fixed mirror 13 and the movable mirror 14 are each oriented so as to reflect the incident infrared light to the direction of 180 degrees and thereby make the infrared light be incident on the beam splitter 12. The fixed mirror 13 is fixed, while the movable mirror 14 is movable in a direction parallel to the optical path so that the distance to the beam splitter 12 will be changed under the control of the control unit 30.

The infrared light reflected by the fixed mirror 13 and the one reflected by the movable mirror 14 enter the beam splitter 12 and are superposed on each other, whereby the two beams of infrared light interfere with each other to form interference light. The sample chamber 15 is located at an incident position of the interference light exiting from the beam splitter 12 and reflected by the second converging mirror 172 for infrared optical axis. A sample is contained in the sample chamber 15.

The first detector 16 is located at an incident position of the interference light passing through the sample chamber 15 (and the sample in the sample chamber 15), and is configured to detect the intensity of the interference light.

The semiconductor laser 21 emits a laser beam composed of monochromatic (single-wavelength) light having a sufficiently smaller diameter than the infrared beam generated by the multiwavelength infrared light source 11. The oscillation wavelength of the laser beam generated by the semiconductor laser 21 has a specified standard value. The semiconductor laser 21 used in the present embodiment has a standard oscillation-wavelength value of 850 nm. However, the actual oscillation wavelength is possibly shifted from the standard value by up to approximately ±20 nm. Such a shift of oscillation wavelength can be calibrated in the present embodiment, as will be described later.

The first converging mirror 171 for infrared optical axis is located between the semiconductor laser 21 and the beam splitter 12. This mirror has a hole at its center. The laser light emitted from the laser 21 passes through this hole and enters the beam splitter 12, which splits the light into two beams. One beam is reflected by the fixed mirror 13, while the other beam is reflected by the movable mirror 14. The reflected beams once more enter the beam splitter 12 and interfere with each other. The interference intensity of the laser beam is maximized when the optical path difference between the laser beam reflected by the fixed mirror 13 and the one reflected by the movable mirror 14 equals an integer multiple of the wavelength of the laser beam.

The second converging mirror 172 for infrared optical axis is located between the beam splitter 12 and the second detector 16. This mirror has a hole at its center. The laser beam (monochromatic interference light) resulting from the interference in the previously described manner passes through the hole of the second converging mirror 172 for infrared optical axis and enters the second detector 16. The second detector 16 detects the intensity of the laser beam resulting from the interference.

The centrals holes of the first converging mirror 171 for infrared optical axis and the second converging mirror 172 for infrared optical axis are both sufficiently smaller than the diameter of the beam of infrared light.

In FIG. 1, the shaded strip represents the optical path of the multiwavelength infrared light. The thick dashed line represents the optical path of the laser beam.

The control unit 30 is embodied by a CPU (central processing unit) and other hardware devices as well as a control program (software). The control unit 30 includes a movable-mirror controller 31, spectrum creator 32, spectrum appropriateness determiner 33, oscillation wavelength calibrator 34 and calibrated value checker 35 as its functional blocks.

The movable-mirror controller 31 is configured to send a control signal to the movable mirror 14 and can control the moving distance and moving speed of the movable mirror.

The spectrum creator 32 is configured to determine an optical path difference between the optical path via the fixed mirror 13 and the optical path via the movable mirror 14, based on the intensity and oscillation wavelength of the monochromatic interference light detected by the second detector 26, as well as to create a wavelength or wavenumber spectrum by performing fast Fourier transform on an interferogram which shows a distribution of the intensity of the infrared interference light detected by the first detector 16 with respect to the optical path difference determined as just described. This process is performed in the measurement of an actual sample as well as in the calibration of the oscillation wavelength of the semiconductor laser 21. It should be noted that the oscillation wavelength to be used in the processing by the spectrum creator 32 for calibrating the oscillation wavelength of the semiconductor laser 21 is the uncalibrated value.

The spectrum appropriateness determiner 33 is configured to determine, based on a predetermined criterion, whether or not the spectrum created by the spectrum creator 32 is an appropriately measured spectrum of the air. In the present embodiment, the highest or lowest value of the background signal is determined within each of the two separate wavenumber ranges, and the ratio between the two highest or lowest values is used as the aforementioned criterion. The used wavenumber ranges are determined according to the wavenumber of the peak to be used in the calibration of the wavelength (the peak wavenumber is not always included within those wavenumber ranges). An example of the wavenumber ranges will be described later.

The oscillation wavelength calibrator 34 is configured to extract peaks from the spectrum created by the spectrum creator 32, locate an absorption peak of carbon dioxide among the extracted peaks, determine the wavenumber or wavelength of that absorption peak, and compare this wavenumber or wavelength with the true absorption wavenumber or wavelength of carbon dioxide to calibrate the oscillation wavelength of the semiconductor laser 21. Details of the operation of the oscillation wavelength calibrator 34 will be described later.

The calibrated value checker 35 is configured to perform the operation of determining whether or not the value of the oscillation wavelength calibrated by the oscillation wavelength calibrator 34 is appropriate.

Figure 2:
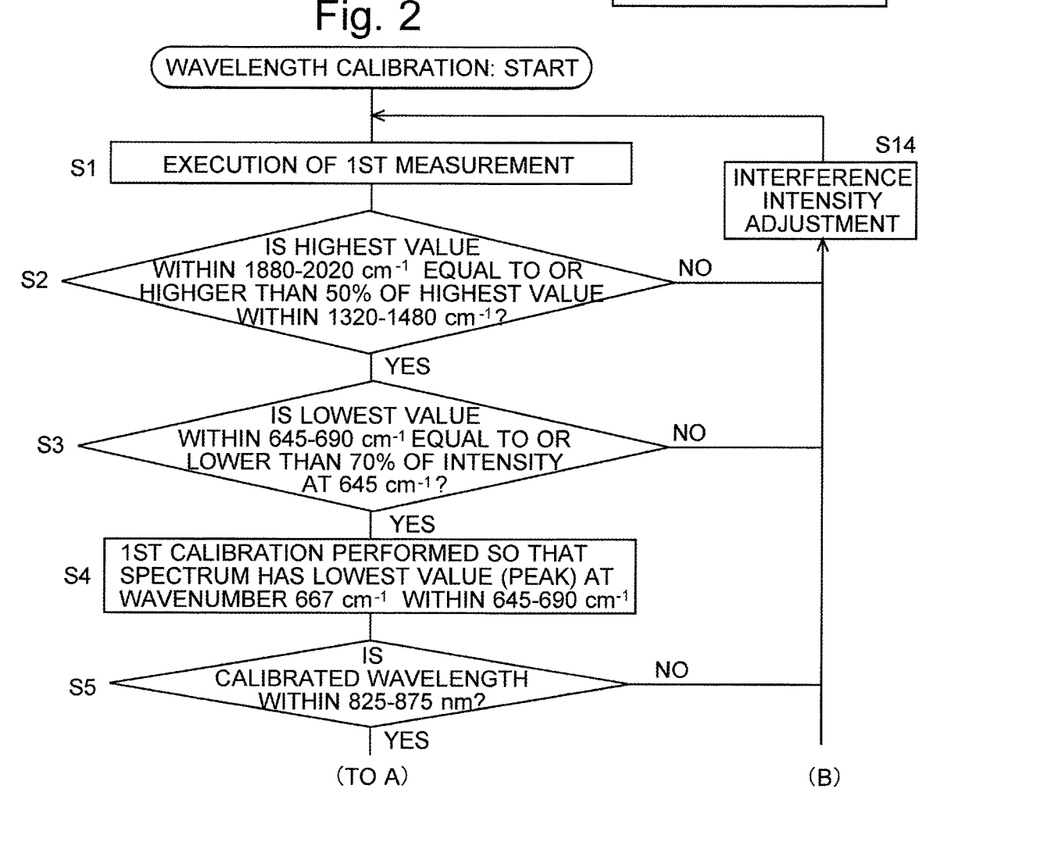
FIG. 2 is the first part of the flowchart showing an operation of the Fourier transform infrared spectrometer according to the present embodiment.
Figure 3:
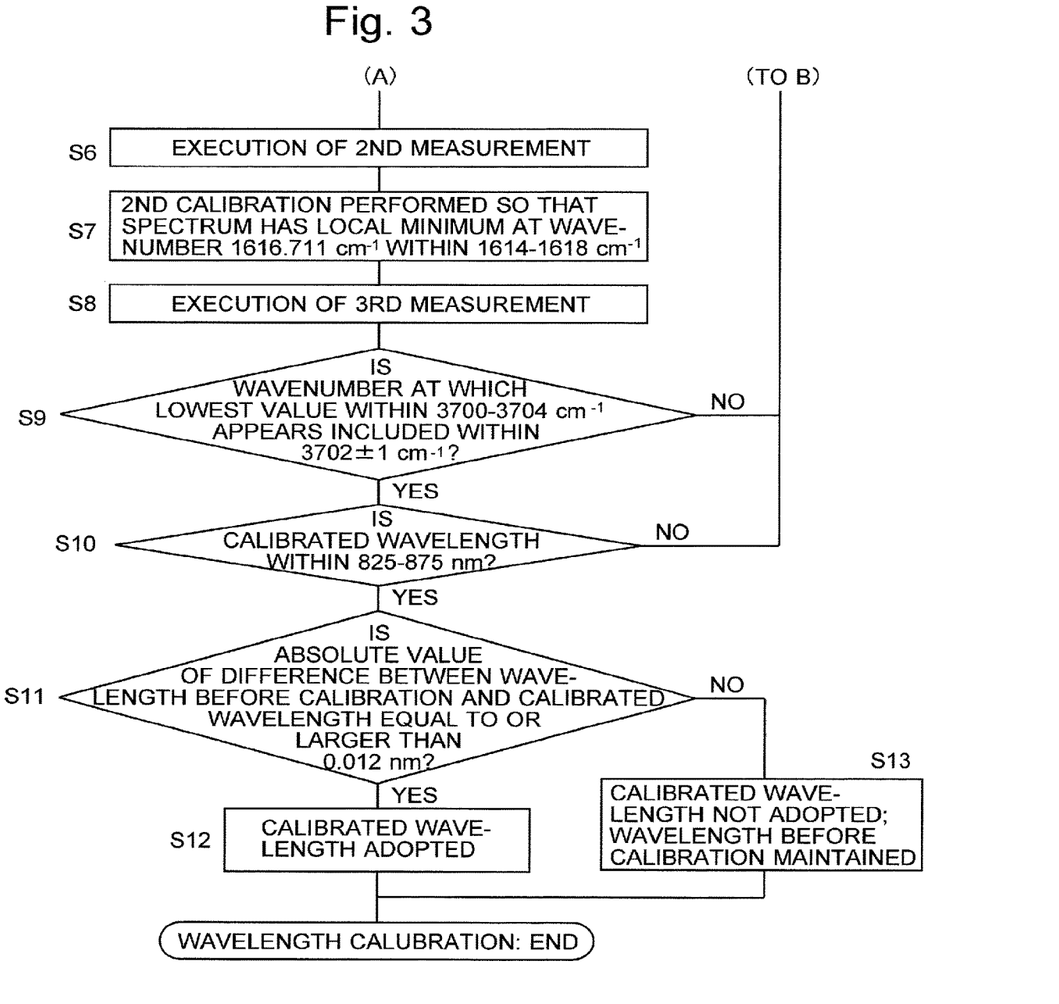
FIG. 3 is the second part of the flowchart showing an operation of the Fourier transform infrared spectrometer according to the present embodiment.

(2) Operation for Calibrating Oscillation Wavelength of Semiconductor Laser 21 in Fourier Transform Infrared Spectrometer According to Present Embodiment Next, an operation of the Fourier transform infrared spectrometer 1 according to the present embodiment is described using the flowcharts shown in FIGS. 2 and 3. The following description is concerned with the operation for calibrating the oscillation wavelength of the semiconductor laser 21. The operation for a normal measurement of a sample is the same as in a normal type of FITR, and therefore, will not be described.

Initially, the first MIR measurement is performed under the condition that only air present in the sample chamber 15 (Step S1).

In this measurement, infrared light is emitted from the multiwavelength infrared light source 11, while a laser beam (monochromatic light) is emitted from the semiconductor laser 21. In this state, the position of the movable mirror 14 is gradually changed under the control of the movable-mirror controller 31, and the intensity of the incident light is detected by each of the first and second detectors 16 and 26. The first detector 16 detects the intensity of the infrared interference light at each point in time, while the second detector 26 detects the intensity of the monochromatic interference light at each point in time. The intensity of the monochromatic interference light has a local maximum value when the optical path difference between the light reflected by the fixed mirror 13 and the light reflected by the movable mirror 14 equals an integer multiple of the actual oscillation wavelength of the semiconductor laser 21. The local maximum periodically occurs with the passage of time (i.e. with the movement of the movable mirror). It should be noted that the actual oscillation wavelength of the semiconductor laser 21 is unknown at this stage. Therefore, the spectrum creator 32 uses either the standard value of the oscillation wavelength specified for the used semiconductor laser 21 or a calibrated value obtained by a previous calibration of the oscillation wavelength (if such a value is available). Every time the intensity of the monochromatic interference light reaches a local maximum value, the spectrum creator 32 determines that the optical path difference has increased or decreased by an amount which equals the oscillation wavelength. Whether the optical path difference has increased or decreased can also be determined, since the direction of the movement of the movable mirror 14 is determined by the control of the movable-mirror controller 31. The spectrum creator 32 determines the temporal change in optical path difference in this manner and relates that temporal change to the intensity of the infrared interference light at each point in time detected by the first detector 16, to acquire an interferogram which shows the distribution of the intensity of the infrared interference light with respect to the optical path difference. Furthermore, the spectrum creator 32 performs fast Fourier transform on this interferogram to create a wavenumber spectrum.

Figure 4:
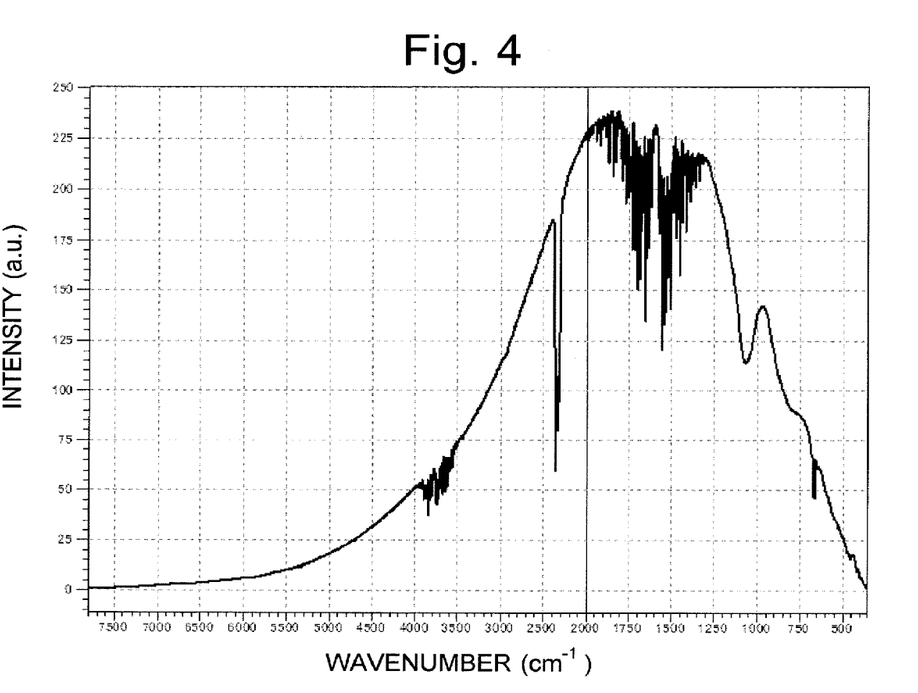
FIG. 4 is a diagram showing one example of the wavenumber spectrum obtained by a measurement in which air is used as the sample.

In a normal measurement of a sample, a spectrum obtained by Fourier-transforming an interferogram of the infrared interference light transmitted through or reflected by the sample is divided by a spectrum obtained by Fourier-transforming an interferogram obtained by the measurement of a background signal, to obtain a spectrum for the sample. However, in the present case, such a dividing operation is useless since the present measurement is performed on the air and hence equivalent to the background measurement. Therefore, in the present case, the spectrum obtained by Fourier-transforming an interferogram in the previously described manner is directly used as the wavenumber spectrum. In this wavenumber spectrum, absorption peaks appear at lower levels (i.e. with smaller values) than the background signal. One example of the obtained wavenumber spectrum is shown in FIG. 4.

In a wavenumber spectrum obtained in this manner, the spectrum appropriateness determiner 33 determines whether or not the highest value of the background signal within a wavenumber range of 1880-2020 $cm^{-1}$ is equal to or higher than 50% of the highest value of the background signal within a wavenumber range of 1320-1480 $cm^{-1}$ (Step S2). If the determination result is "No", it is possible to consider, for example, that the background spectrum is abnormal due to a sample which has been subjected to a measurement and still remains in the sample chamber 15. Accordingly, in the case where the determination result is "No", the operation proceeds to Step S14 to adjust the interference intensity by setting the optical system so as to reduce the influence of oblique incidence. After this adjustment, the operation returns to Step S1 to once more perform the measurement. If the determination result is "Yes", the operation proceeds to Step S3.

In Step S3, the spectrum appropriateness determiner 33 determines whether or not the lowest value of the intensity of the spectrum within a wavenumber range of 645-690 $cm^{-1}$ is equal to or lower than 70% of the intensity value at 645 $cm^{-1}$. If the determination result is "No", it is possible that the correct absorption peak is not present. Therefore, the operation proceeds to Step S14 to adjust the interference intensity, and subsequently returns to Step S1 to once more perform the measurement. If the determination result is "Yes", the operation proceeds to Step S4.

In Step S4, the oscillation wavelength calibrator 34 calibrates the oscillation wavelength of the semiconductor laser 21 (first calibration) so that the wavenumber at which the intensity of the spectrum has the lowest value within a wavenumber range of 645-690 $cm^{-1}$ will have a value of 667 $cm^{-1}$. The wavenumber of 667 $cm^{-1}$ is the wavenumber of the absorption peak of carbon dioxide. As shown in the example of FIG. 4, the absorption spectrum of air has no other peak around the absorption peak of carbon dioxide at the wavenumber of 667 $cm^{-1}$. Therefore, this peak can be easily located. The calibration of the oscillation wavelength is normally performed by calculating the calibrated oscillation wavelength $\lambda_1$ by $\lambda_1 = \lambda_0 \times (k'/k)$, where k' ($cm^{-1}$) is the peak wavenumber on the obtained spectrum, k ($cm^{-1}$) is the wavenumber of the true absorption peak, and $\lambda_0$ is the uncalibrated oscillation wavelength of the semiconductor laser. In Step S4, k=667 cm$^{-1}$, and $\lambda_0$ is 850 nm, i.e. the standard value of the oscillation wavelength of the semiconductor laser 21. The calibrated oscillation wavelength $\lambda_1$ is given by $\lambda_1$=850×(k'/667).

After the operation of Step S4, the calibrated value checker 35 determines whether or not the calibrated oscillation wavelength $\lambda_1$ is within a range of 825-875 nm, i.e. ±25 nm from 850 nm which is the standard value of the oscillation wavelength of the semiconductor laser 21 (Step S5). If the determination result is "No", the operation proceeds to Step S14 to adjust the interference intensity, and subsequently returns to Step S1 to once more perform the measurement. If the determination result is "Yes", the operation proceeds to Step S6.

In Step S6, the second FTIR measurement in which air is used as the sample is performed using the calibrated oscillation wavelength $\lambda_1$, and the spectrum creator 32 creates a wavenumber spectrum. The details of the method for this measurement is the same as in the first FTIR measurement performed in Step S1 except for the value of the oscillation wavelength used for determining the optical path difference. Based on the wavenumber spectrum obtained by this measurement, the oscillation wavelength calibrator 34 performs the (second) calibration of the oscillation wavelength of the semiconductor laser 21 so that the intensity of the spectrum has the lowest value at a wavenumber of 1616.711 cm$^{-1}$ within a wavenumber range of 1614-1618 cm$^{-1}$, and determines a calibrated oscillation wavelength $\lambda_2$ (Step S7). The method for calibrating the oscillation wavelength is the same as in the first calibration (Step S4).

The wavenumber of 1616.711 cm$^{-1}$ is the wavenumber of an absorption peak of water vapor. This absorption peak at the wavenumber of 1616.711 cm$^{-1}$ has other absorption peaks of water vapor appearing in its vicinity at 1576.185 cm$^{-1}$, 1662.809 cm$^{-1}$ and other wavenumbers. Therefore, if the absorption peak at 1616.711 cm$^{-1}$ were used in the first calibration, one of those other absorption peaks located in its vicinity might possibly be misidentified as the absorption peak at 1616.711 cm$^{-1}$. Such misidentification particularly easily occurs if an inexpensive semiconductor laser having an oscillation wavelength considerably shifted from the standard value is used. By comparison, in the present embodiment, a wavenumber spectrum for the second calibration is created using the first calibrated oscillation wavelength. This significantly reduces the amount of shift of the wavenumbers of the absorption peaks from the true values, thereby preventing the other absorption peaks prevented from being misidentified as the absorption peak at 1616.711 cm$^{-1}$.

The absorption peak of water vapor obtained by the measurement in the present device is higher and sharper than the absorption peak of carbon dioxide. The second calibration using such an absorption peak enables a more accurate calibration of the oscillation wavelength of the semiconductor laser 21 than in the case where only a single calibration based on the absorption peak of carbon dioxide is performed.

Next, the third FTIR measurement in which air is used as the sample is performed using the second calibrated oscillation wavelength $\lambda_2$, and the spectrum creator 32 creates a wavenumber spectrum. The details of the method for this measurement is the same as in the first FTIR measurement (Step S1) and the second FTIR measurement (Step S6) except for the value of the oscillation wavelength used for determining the optical path difference. The spectrum appropriateness determiner 33 locates the wavenumber at which the intensity of the spectrum has the lowest value within a wavenumber range of 3700-3704 cm$^{-1}$, and determines whether or not the located value is within a range of 3702±1 cm$^{-1}$ (Step S9). The wavenumber of 3702 cm$^{-1}$ corresponds to an absorption peak of water vapor which appears at a separate position from the peak used in the second calibration. If the second calibration has been correctly performed, the lowest value should be located within the range of 3702±1 cm$^{-1}$. If the determination result is "No" against the expectation, the operation proceeds to Step S14 to adjust the interference intensity by appropriately setting the optical system, and the operations from Step S1 are once more performed.

If the determination result in Step S9 is "Yes", the operation proceeds to Step S10. The calibrated value checker 35 determines whether or not the second calibrated oscillation value $\lambda_2$ is within a range of 825-875 nm. If the determination result is "No", the operation proceeds to Step S14 to adjust the interference intensity by appropriately setting the optical system, and the operations from Step S1 are once more performed. If the determination result is "Yes", the operation proceeds to Step S11.

In Step S11, the calibrated value checker 35 calculates the difference between the second calibrated oscillation wavelength $\lambda_2$ and the oscillation wavelength $\lambda_0$ used before the first calibration, as well as determines whether or not the absolute value of that difference is equal to or larger than 0.012 nm (i.e. whether or not the difference is equal to or greater than +0.012 nm, or equal to or less than −0.012 nm). If the determination result is "Yes", the second calibrated oscillation wavelength $\lambda_2$ is adopted as the final value of the calibrated oscillation wavelength (Step S12), and the entire series of operations is completed. If the determination result in Step S11 is "No", it is most likely that the oscillation wavelength $\lambda_0$ used before the first calibration is also within an allowable range. Therefore, this value of the oscillation wavelength $\lambda_0$ is maintained (Step S13), and the entire series of operations is completed.

The present invention is not limited to the previously described embodiment. It can be modified in various forms.

For example, the thresholds for the determination performed by the calibrated value checker 35 in Steps S5, S10 and S11 can be changed according to the required accuracy of the calibration.

The second calibration may be omitted, and the first calibrated oscillation wavelength $\lambda_1$ may be adopted as the final value of the calibrated oscillation wavelength. In that case, the absorption peaks of water vapor are not used, and only the absorption peak of carbon dioxide is used for the calibration. To adopt this method, it is preferable that the device be capable of performing a high-resolution measurement that can resolve the absorption of carbon dioxide.

In the previously describe embodiment, only the absorption peak of water vapor at a peak wavenumber of 1616.711 cm$^{-1}$ is used for the calibration of the oscillation wavelength in Step S7 (it should be noted that the absorption peak of water vapor at a peak wavenumber of 3702 cm$^{-1}$ used in Step S9 is not directly used for the calibration of the oscillation wavelength; this peak is merely used for determining whether or not the obtained spectrum is appropriate). It is also possible to use a plurality of absorption peaks of water vapor for the calibration of the oscillation wavelength. According to the aforementioned relationship $\lambda_1=\lambda_0\times(k'/k)$, the ratio of the peak wavenumber k' determined from the created spectrum to the wavenumber k of the true absorption peak, i.e. k'/k, has a constant value at any one of the absorption peaks of water vapor, so that the relationship $k=A\times k'$ holds true (where A is a constant). However, the value of the peak wavenumber k' can have a certain amount of error. To address this problem, the relationship may be considered as a linear function with the peak wavenumber k' as the variable, and the value of constant A may be determined by a least squares method based on a plurality of values of the peak wavenumber k' obtained from a plurality of absorption peaks. The calibrated oscillation wavelength $\lambda_1$ can be calculated by $\lambda_1=\lambda_0\times(k'/k)=\lambda_0\times A$. Among the many absorption peaks of water vapor, six absorption peaks which appear at wavenumbers of 1447.952 cm$^{-1}$, 1464.905 cm$^{-1}$, 1576.185 cm$^{-1}$, 1616.711 cm$^{-1}$, 1662.809 cm$^{-1}$ and 1756.819 cm$^{-1}$ have larger intervals of wavenumber to the neighboring peaks than the other peaks. It is preferable to use two to six peaks selected from those six absorption peaks.

REFERENCE SIGNS LIST

1 . . . Fourier Transform Infrared Spectrometer
10 . . . Main Interferometer
11 . . . Multiwavelength Infrared Light Source
12 . . . Beam Splitter
13 . . . Fixed Mirror
14 . . . Movable Mirror
15 . . . Sample Chamber
16 . . . First Detector
171 . . . First Converging Mirror for Infrared Optical Axis
172 . . . Second Converging Mirror for Infrared Optical Axis
20 . . . Control Interferometer
21 . . . Semiconductor Laser
26 . . . Second Detector
30 . . . Control Unit
31 . . . Movable-Mirror Controller
32 . . . Spectrum Creator
33 . . . Spectrum Appropriateness Determiner
34 . . . Oscillation Wavelength Calibrator
35 . . . Calibrated Value Checker

The invention claimed is:

1. A Fourier transform infrared spectrometer, comprising:
a main interferometer including a multiwavelength infrared light source, a beam splitter, a fixed mirror and a movable mirror;
a control interferometer including a semiconductor laser, the beam splitter, the fixed mirror and the movable mirror;
a first detector configured to detect infrared interference light generated by the main interferometer and transmitted through or reflected by a sample;
a second detector configured to detect monochromatic interference light generated by the control interferometer;
a spectrum creator configured to determine an optical path difference between an optical path via the fixed mirror and an optical path via the movable mirror, based on an intensity and uncalibrated oscillation wavelength of the monochromatic interference light detected by the second detector, and to create a spectrum by performing fast Fourier transform on an interferogram which shows a distribution of the intensity of the infrared interference light detected by the first detector with respect to the optical path difference; and
an oscillation wavelength calibrator configured to locate an absorption peak of carbon dioxide from peaks in the spectrum created by the spectrum creator, and to determine a calibrated oscillation wavelength of the semiconductor laser by multiplying an uncalibrated oscillation wavelength of the semiconductor laser by a ratio of a peak wavenumber of the absorption peak of carbon dioxide to a peak wavenumber of a true absorption peak of carbon dioxide or by multiplying the uncalibrated oscillation wavelength of the semiconductor laser by a ratio of a peak wavelength of the true absorption peak of carbon dioxide to a peak wavelength of the absorption peak of carbon dioxide.

2. The Fourier transform infrared spectrometer according to claim 1, further comprising:
an oscillation wavelength precise calibrator configured to calibrate the oscillation wavelength by creating a spectrum based on the calibrated oscillation wavelength obtained by the oscillation wavelength calibrator, the intensity of the monochromatic interference light detected by the second detector and the intensity of the infrared interference light detected by the first detector, locating at least one absorption peak of water vapor from peaks in the spectrum, and comparing the wavenumber or wavelength at each of the at least one absorption peak with a true absorption wavenumber or wavelength of water vapor.

3. The Fourier transform infrared spectrometer according to claim 2, wherein the oscillation wavelength precise calibrator is configured to perform precise calibration such that a difference is minimized between the obtained wavenumber or wavelength and the true absorption wavenumber or wavelength for each of the absorption peaks of water vapor.

4. The Fourier transform infrared spectrometer according to claim 3, wherein the at least one absorption peak of water vapor is two to six absorption peaks selected from six absorption peaks which appear at wavenumbers of 1447.952 cm$^{-1}$, 1464.905 cm$^{-1}$, 1576.185 cm$^{-1}$, 1616.711 cm$^{-1}$, 1662.809 cm$^{-1}$ and 1756.819 cm$^{-1}$.

5. The Fourier transform infrared spectrometer according to claim 1, further comprising:
a spectrum appropriateness determiner configured to determine, based on a predetermined criterion, whether or not the spectrum created by the spectrum creator is an appropriately measured spectrum of air.

6. The Fourier transform infrared spectrometer according to claim 2, further comprising:
a spectrum appropriateness determiner configured to determine, based on a predetermined criterion, whether or not the spectrum created by the spectrum creator is an appropriately measured spectrum of air.

7. The Fourier transform infrared spectrometer according to claim 3, further comprising:
a spectrum appropriateness determiner configured to determine, based on a predetermined criterion, whether or not the spectrum created by the spectrum creator is an appropriately measured spectrum of air.

8. The Fourier transform infrared spectrometer according to claim 4, further comprising:
a spectrum appropriateness determiner configured to determine, based on a predetermined criterion, whether or not the spectrum created by the spectrum creator is an appropriately measured spectrum of air.

9. A Fourier transform infrared spectrometer, comprising:
a main interferometer including a multiwavelength infrared light source, a beam splitter, a fixed mirror and a movable mirror;
a control interferometer including a semiconductor laser, the beam splitter, the fixed mirror and the movable mirror;

a first detector configured to detect infrared interference light generated by the main interferometer and transmitted through or reflected by a sample;

a second detector configured to detect monochromatic interference light generated by the control interferometer; and a control unit comprising circuitry configured to determine an optical path difference between an optical path via the fixed mirror and an optical path via the movable mirror, based on an intensity and uncalibrated oscillation wavelength of the monochromatic interference light detected by the second detector, to create a spectrum by performing fast Fourier transform on an interferogram which shows a distribution of the intensity of the infrared interference light detected by the first detector with respect to the optical path difference, to locate an absorption peak of carbon dioxide from peaks in the spectrum, and to determine a calibrated oscillation wavelength of the semiconductor laser by multiplying an uncalibrated oscillation wavelength of the semiconductor laser by a ratio of a peak wavenumber of the absorption peak of carbon dioxide to a peak wavenumber of a true absorption peak of carbon dioxide or by multiplying the uncalibrated oscillation wavelength of the semiconductor laser by a ratio of a peak wavelength of the true absorption peak of carbon dioxide to a peak wavelength of the absorption peak of carbon dioxide.

10. The Fourier transform infrared spectrometer according to claim 9, wherein the circuitry of the control unit is further configured to calibrate the oscillation wavelength by creating a spectrum based on the calibrated oscillation wavelength, the intensity of the monochromatic interference light detected by the second detector and the intensity of the infrared interference light detected by the first detector, locating at least one absorption peak of water vapor from peaks in the spectrum created based on the calibrated oscillation wavelength, and comparing the wavenumber or wavelength at each of the at least one absorption peak with a true absorption wavenumber or wavelength of water vapor.

11. The Fourier transform infrared spectrometer according to claim 10, wherein the circuitry of the control unit is configured to minimize a difference between the obtained wavenumber or wavelength and the true absorption wavenumber or wavelength for each of the absorption peaks of water vapor.

12. The Fourier transform infrared spectrometer according to claim 11, wherein the at least one absorption peak of water vapor is two to six absorption peaks selected from six absorption peaks which appear at wavenumbers of $1447.952$ $cm^{-1}$, $1464.905$ $cm^{-1}$, $1576.185$ $cm^{-1}$, $1616.711$ $cm^{-1}$, $1662.809$ $cm^{-1}$ and $1756.819$ $cm^{-1}$.

13. The Fourier transform infrared spectrometer according to claim 9, wherein the circuitry of the control unit is further configured to determine, based on a predetermined criterion, whether or not the spectrum is an appropriately measured spectrum of air.

14. The Fourier transform infrared spectrometer according to claim 10, wherein the circuitry of the control unit is further configured to determine, based on a predetermined criterion, whether or not the spectrum created by performing the fast Fourier transform on the interferogram is an appropriately measured spectrum of air.

15. The Fourier transform infrared spectrometer according to claim 11, wherein the circuitry of the control unit is further configured to determine, based on a predetermined criterion, whether or not the spectrum created by performing the fast Fourier transform on the interferogram is an appropriately measured spectrum of air.

16. The Fourier transform infrared spectrometer according to claim 12, wherein the circuitry of the control unit is further configured to determine, based on a predetermined criterion, whether or not the spectrum created by performing the fast Fourier transform on the interferogram is an appropriately measured spectrum of air.

17. The Fourier transform infrared spectrometer according to claim 13, wherein the predetermined criterion includes determining whether or not a highest value of a background signal within a first wavenumber range is equal to or higher than 50% of a highest value of the background signal within a second wavenumber range, and determining whether or not a lowest value of the intensity of a spectrum within a third wavenumber range is equal to or lower than 70% of an intensity value at a lower limit of the third wavenumber range.

18. The Fourier transform infrared spectrometer according to claim 14, wherein the predetermined criterion includes determining whether or not a highest value of a background signal within a first wavenumber range is equal to or higher than 50% of a highest value of the background signal within a second wavenumber range, and determining whether or not a lowest value of the intensity of a spectrum within a third wavenumber range is equal to or lower than 70% of an intensity value at a lower limit of the third wavenumber range.

19. The Fourier transform infrared spectrometer according to claim 9, wherein the circuitry of the control unit is further configured to determine whether or not the calibrated oscillation wavelength is within a range of a standard value of an oscillation wavelength of the semiconductor laser.

20. The Fourier transform infrared spectrometer according to claim 17, wherein the circuitry of the control unit is further configured to determine whether or not the calibrated oscillation wavelength is within a range of a standard value of an oscillation wavelength of the semiconductor laser.

* * * * *